(12) United States Patent
Xing et al.

(10) Patent No.: US 8,996,044 B2
(45) Date of Patent: Mar. 31, 2015

(54) CONFLICT AVOIDANCE IN A DEVICE CONFIGURED TO OPERATE ACCORDING TO MULTIPLE CELLULAR COMMUNICATION PROTOCOLS

(71) Applicant: Apple Inc., Cupertino, CA (US)

(72) Inventors: Longda Xing, San Jose, CA (US); Wen Zhao, Cupertino, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 13/750,518

(22) Filed: Jan. 25, 2013

(65) Prior Publication Data

US 2014/0073366 A1    Mar. 13, 2014

Related U.S. Application Data

(60) Provisional application No. 61/698,684, filed on Sep. 9, 2012.

(51) Int. Cl.
*H04W 68/00* (2009.01)
*H04W 24/02* (2009.01)

(52) U.S. Cl.
CPC .................................. *H04W 24/02* (2013.01)
USPC .................... 455/458; 455/422.1; 455/552.1; 455/558

(58) Field of Classification Search
CPC ............................ H04W 88/06; H04W 76/048
USPC ............................ 455/558, 458, 422.1, 552.1
See application file for complete search history.

(56) References Cited

U.S. PATENT DOCUMENTS

| | | | |
|---|---|---|---|
| 2010/0169496 A1* | 7/2010 | Deshpande et al. | 709/227 |
| 2012/0264483 A1 | 10/2012 | Chin et al. | |
| 2013/0035120 A1 | 2/2013 | Dhanda et al. | |
| 2013/0342394 A1* | 12/2013 | Leslie et al. | 342/357.31 |
| 2014/0038671 A1* | 2/2014 | Christensen et al. | 455/558 |
| 2014/0073312 A1* | 3/2014 | Su et al. | 455/419 |

FOREIGN PATENT DOCUMENTS

WO    2012/079962    6/2012

* cited by examiner

*Primary Examiner* — Barry Taylor
(74) *Attorney, Agent, or Firm* — Meyertons, Hood, Kivlin, Kowert & Goetzel, P.C.

(57) ABSTRACT

Avoiding conflicts between radio access technologies (RATs) in a device configured to operate according to multiple RATs. The device may be operated in a discontinuous reception (DRX) mode according to each of a first RAT and a second RAT using a shared radio. It may be determined that a conflicting wakeup time is scheduled according to DRX cycles of the first and second RATs. A subscriber identity of the device may be changed in response to determining that a conflicting wakeup time is scheduled according to DRX cycles of the first and second RATs.

19 Claims, 4 Drawing Sheets

CONFLICT AVOIDANCE IN A DEVICE CONFIGURED TO OPERATE ACCORDING TO MULTIPLE CELLULAR COMMUNICATION PROTOCOLS

PRIORITY CLAIM

The present application claims benefit of priority to U.S. Provisional Application No. 61/698,684 titled "Conflict Avoidance in a Device Configured to Operate According to Multiple Cellular Communication Protocols" and filed on Sep. 9, 2012, whose inventors are Longda Xing, Wen Zhao, and Jianxiong Shi, and which is hereby incorporated by reference in its entirety as though fully and completely set forth herein.

FIELD

The subject matter disclosed herein relates to the field of wireless communication, and more particularly to a system and method for avoiding conflicts between cellular communication protocols in a device configured to operate according to multiple cellular communication protocols.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

An alternative might include a device which uses a single functional block (e.g., a single radio) to implement multiple wireless communication technologies. However, sharing a single radio between multiple wireless technologies has its own set of challenges. For example, if only one wireless technology can use the radio at a time, there may occasionally (or frequently) be conflicts between the wireless technologies for use of the radio. Accordingly, improvements in wireless communications and devices performing wireless communications would be desirable.

SUMMARY

As noted above, a device which uses a single functional block (e.g., a single radio) to implement multiple wireless communication technologies may have significant advantages relative to a device which uses separate functional blocks (e.g., separate radios) to implement different wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

As one example, in some cases a device may implement separate protocol stacks for each of multiple radio-access technologies (RATs) that share a radio. The protocol stacks may take turns operating the radio. If both protocol stacks are scheduled to use the radio at the same time, there may be a conflict or collision between the RATs.

For example, if both RATs are operating in a discontinuous reception (DRX) mode, such as an idle mode or a connected-mode DRX, it is possible that scheduled wake-up times could conflict. In other words, both RATs could be scheduled to use the radio at the same time. Accordingly, providing a way to handle such potential conflicts, or even avoid such conflicts altogether, may be an important consideration.

The present disclosure relates to a system and method for avoiding such conflicts between RATs in a device configured to operate according to multiple RATs. Embodiments of the disclosure may thus be directed to such a method for avoiding conflicts between RATs in a UE device configured to communicate using multiple RATs, to a UE device configured to implement such a method, and/or to a computer accessible memory medium storing program instructions executable by a processor to implement such a method.

In particular, according to many RATs, paging occasion timing for a given device may be calculated by a network operating according to a RAT based on a subscriber identity of the device in a known (predictable) manner. Thus, a device may be able to calculate its paging occasions according to each of the multiple RATs according to which it is capable of operating. This may of course be important in order for the device to know at what point in a DRX cycle to wakeup and check for paging messages; likewise it can be used to determine if paging occasions for multiple RATs sharing a radio of the device will conflict.

As noted above, the paging occasions for a device are commonly calculated based on a subscriber identity of that device, even for different RATs. However, it may also be true that paging occasions may be calculated by different RATs (and often by different networks operating according to the same RAT) in different ways. Furthermore, different networks operating according to different RATs may be independent and de-coupled from one another, even when operated by the same service provider. So even though paging occasions for multiple RATs sharing a radio in a device may be based on the same subscriber identity, those paging occasions typically will not conflict for most subscriber identities under most circumstances.

Accordingly, if it happens that paging opportunities according to multiple RATs sharing a radio in a device do conflict, one possible way of avoiding such conflicts may be to switch a subscriber identity of the device. Since this may change the basis for calculating the paging opportunities for the device according to each of the conflicting RATs, it is possible that after switching the subscriber identity, the paging occasions will no longer conflict.

Note that such a technique may require the device to support multiple subscriber identities. For example, the device may come pre-loaded with multiple subscriber identities (e.g., international mobile subscriber identities or "IMSIs") on a removable subscriber identity module (SIM) card. Alternatively, it may be possible for the device to acquire (e.g., purchase or trade out) a new subscriber identity and download the new subscriber identity to an embedded SIM (an eSIM) on the device. The new subscriber identity may then be stored in the eSIM in addition to the original subscriber identity, or may replace the original subscriber identity, as desired.

Thus, according to the present disclosure, conflicts between RATs sharing a radio in a wireless device may advantageously be avoided under many circumstances simply by changing the basis on which paging occasions are calculated (e.g., by switching a subscriber identity of the UE device) upon detecting a conflict.

BRIEF DESCRIPTION OF THE DRAWINGS

A better understanding of the present subject matter can be obtained when the following detailed description of the preferred embodiment is considered in conjunction with the following drawings, in which.

Figure 1:
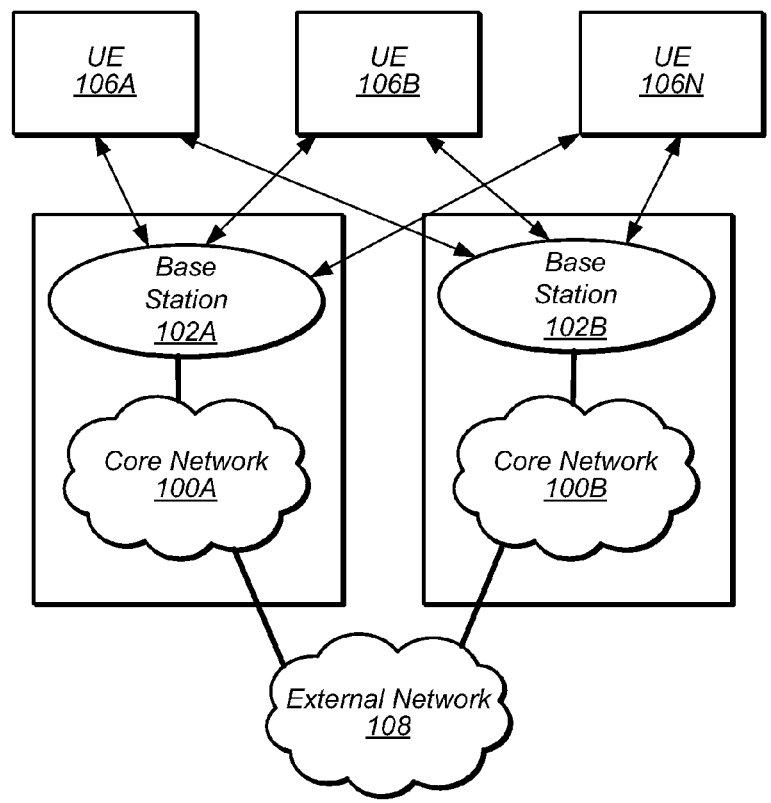
FIG. 1 illustrates an exemplary wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution Terms The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
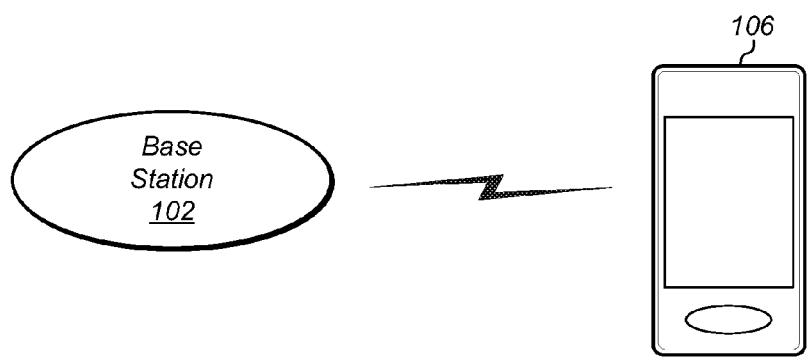
FIG. 2 illustrates a base station in communication with a user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base stations 102A and 102B which communicate over a transmission medium with one or more user devices 106-1 through 106-N. Each of the user devices may be referred to herein as a "user equipment" (UE). Thus, the user devices are referred to as UEs or UE devices.

The base stations 102 may be base transceiver stations (BTS) or cell sites, and comprises hardware that enables wireless communication with the user devices 106-1 through 106-N. Each base station 102 may also be equipped to communicate with a core network 100 (Base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), or any other network. Thus, the base stations 102 may facilitate communication between the user devices and/or between the user devices and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX) etc.

Base station 102A and core network 100A may operate according to a first cellular communication standard (e.g., LTE) while base station 102B and core network 100B operate according to a second (e.g., different) cellular communication standard (e.g., one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 1, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1xRTT, or any other combination of cellular communication technologies) might be coupled to a core network that also supports the different cellular communication technologies. Any of various other network deployment scenarios are also possible.

UE 106 may be capable of communicating using multiple wireless communication standards. For example, a UE 106 might be configured to communicate using either of a 3GPP cellular communication standard (such as LTE) or a 3GPP2 cellular communication standard (such as a cellular communication standard in the CDMA2000 family of cellular communication standards). Thus, UE 106 might be configured to communicate with base station 102A according to the first cellular communication standard (e.g., LTE) and might also be configured to communicate with base station 102B according to the second cellular communication standard (e.g., CDMA20001xRTT).

Base stations 102A and 102B and other base stations operating according to the same or different cellular communication standards may thus be provided as a network of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

As noted above, the UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1xRTT/1xEV-DO/HRPD/eHRPD) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT, and separate radios for communicating using each of Wi-Fi and Bluetooth. Other configurations are also possible.

Figure 3:
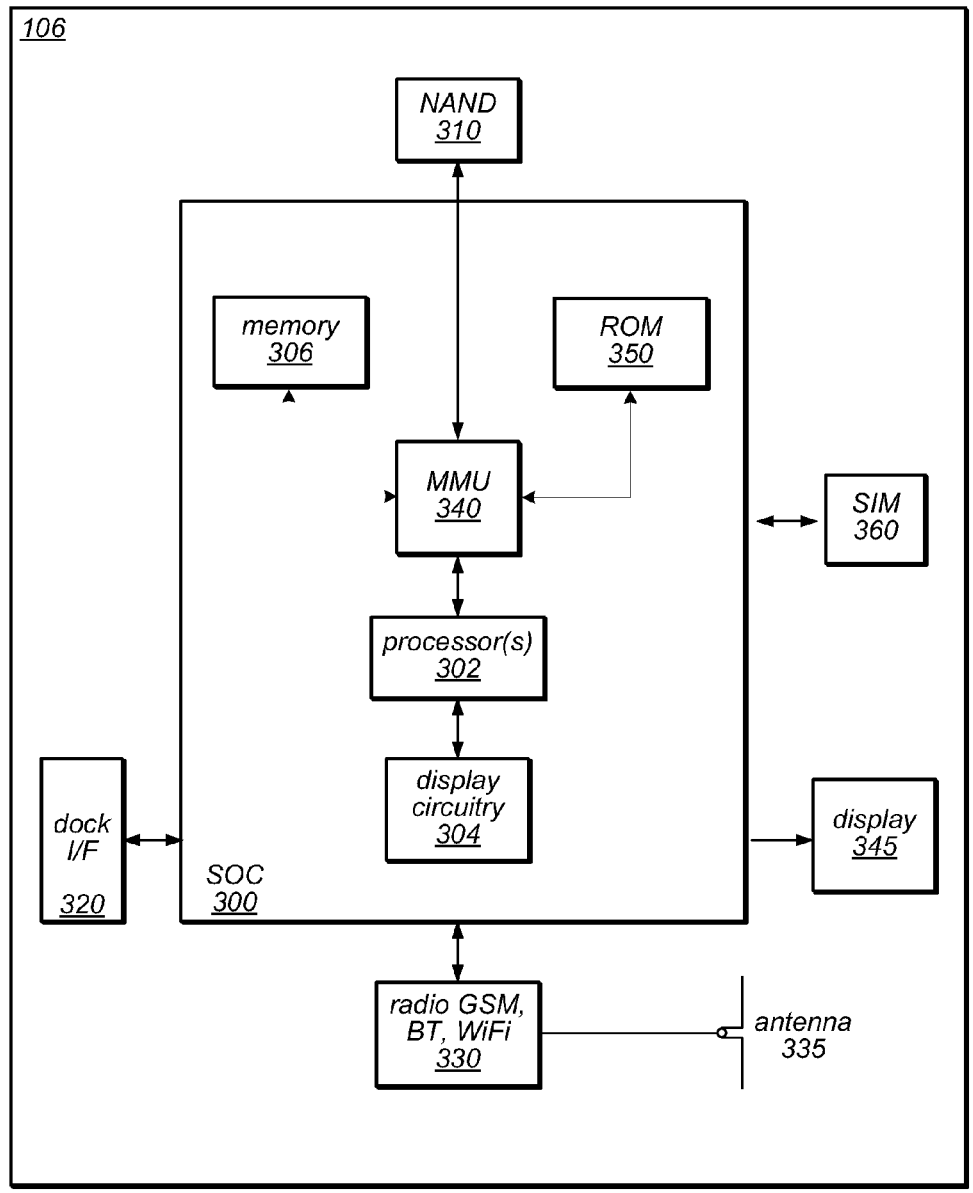
FIG. 3 is an example block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 345, and wireless communication circuitry 330 (e.g., for LTE, LTE-A, CDMA2000, Bluetooth, WiFi, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

As also shown, the UE 106 may also include a SIM (Subscriber Identity Module) 360. The SIM 360 may be implemented as an application on a smart card, in some embodiments. The smart card may itself be referred to as a SIM card in some cases. As one example, the SIM 360 may be an application which executes on a Universal Integrated Circuit Card (UICC). The smart card may also include (e.g., store and/or execute) one or more other applications, if desired. The smart card may be removable.

Alternatively, the SIM 360 may be implemented as an embedded SIM (eSIM). In this case, the SIM 360 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306) executing on a processor (such as processor 302) in the UE 106.

The SIM 360 may include a number of types of information, including personalized information specific to a user and/or device (e.g., personalized information), and information that is not specific to a user and/or device (e.g., common information). The common portion may include files, data structures, and/or applications that may be common among some or all types of SIMs (e.g., among UICCs/eUICCs of the same profile). The personalized information may include user/unit specific data, for example information identifying the user/unit to their carrier's network, personalized authorization and/or security information, etc.

As one example, the personalized information may include one or more International Mobile Subscriber Identity (IMSI) numbers. An IMSI may identify the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

As described herein, the UE 106 may include hardware and software components for implementing a method for avoiding conflicts between RATs according to embodiments of this disclosure.

Figure 4:
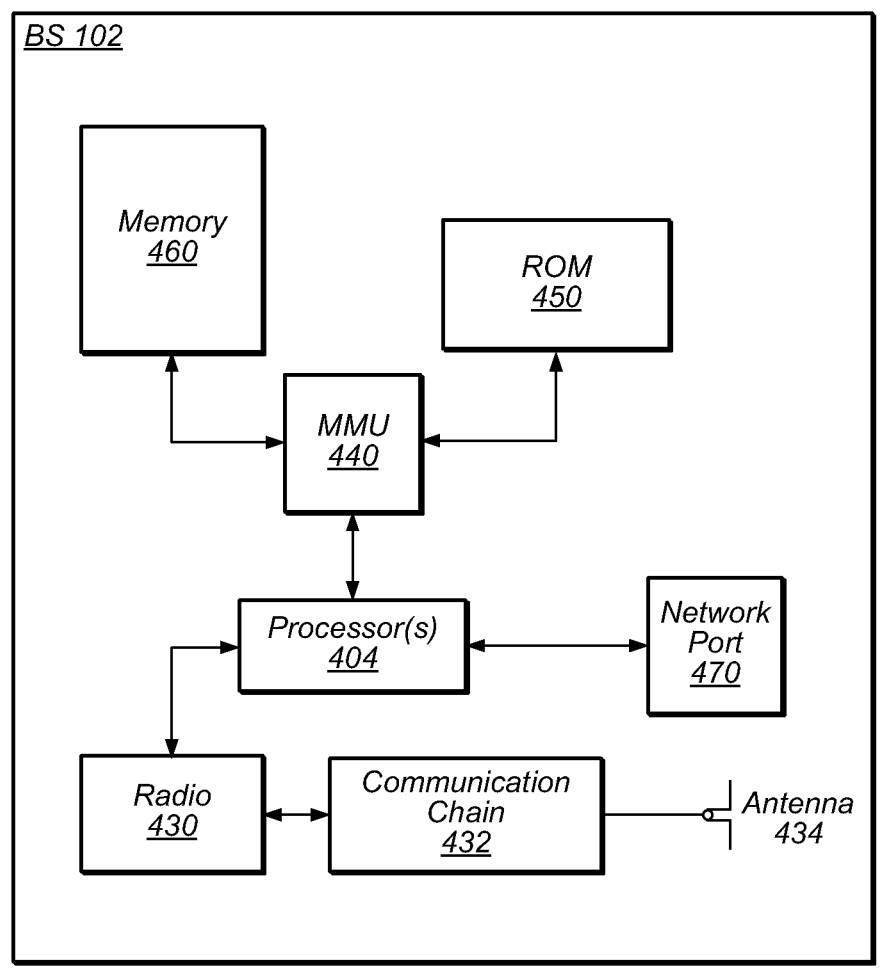
FIG. 4 is an example block diagram of a base station.

FIG. 4—Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Figure 5:
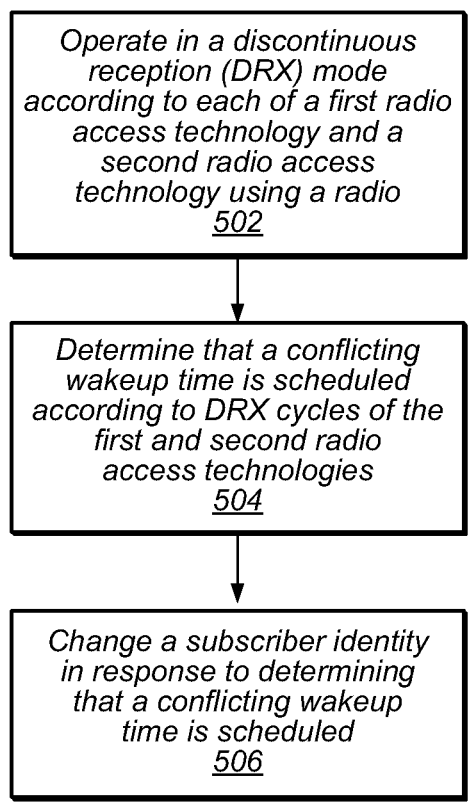
FIG. 5 is a flowchart diagram illustrating an exemplary method for avoiding conflicts between radio access technologies (RATs) in a multi-RAT user equipment device.

FIG. 5 is a flowchart diagram illustrating a method for avoiding conflicts between radio access technologies (RATs) in a device configured to operate according to multiple RATs using a shared radio. The method may be implemented by a wireless UE device (such as UE 106), which may be configured to communicate using multiple RATs.

The UE 106 may be configured to communicate using multiple RATs (e.g., multiple cellular communication protocols) using a shared radio. For example, one or more RF signaling components, such as one or more antennas, gain elements, filtering elements, ADCs and/or DACs, and/or other analog or digital circuitry may be used to perform wireless communication by the UE according to any of the multiple RATs using the shared radio. Note that not all RF components may need to be shared by the RATs for the radio to be considered shared. It may be the case that at any given time, only one of the RATs sharing a radio may use the radio.

Sharing a radio between two (or more) RATs may be advantageous for energy efficiency, manufacturing cost, and form factor of a UE 106, among other possible advantages. However, if only one of the RATs can operate at a time, it is possible that conflicts may occur between the RATs, e.g., when both RATs are scheduled to or otherwise have reason to use the radio during an overlapping time period.

In particular, it is common for RATs to operate in a discontinuous reception (DRX) mode. Different types of DRX modes of operation exist, including for example idle-mode DRX and connected-mode DRX. In a DRX mode of operation, a RAT may generally actively operate (e.g., including using the radio and/or performing other functions) for short "wakeup" or "on-duration" periods of time, and operate in a reduced power state for longer periods of time between the wakeups in an alternating cyclical or regular periodic manner. During the active portion of the DRX cycle for a RAT, the UE may be configured to perform any of a variety of operations (e.g., specified by the RAT protocol and/or a network operator providing service according to the RAT). For example, common operations for a UE during a wakeup portion of a DRX cycle might include checking for (and potentially decoding) paging messages from a network, performing signal strength measurements for a serving cell and possibly also for neighboring cells, and potentially performing cell re-selection procedures depending on the results of any cell signal strength measurements.

It should be noted that while opportunities to perform signal strength measurements for a serving cell and possibly also for neighboring cells may not be limited to scheduled wakeup times, the DRX cycle wakeup times for the UE according to the first and second RATs, respectively, may be scheduled to correspond to paging opportunities for the UE according to the first and second RATs, respectively. In other words, a network operating according to the first RAT may only transmit paging messages to the UE 106 at scheduled wakeup times (paging opportunities) according to the DRX cycle of the first RAT, while a network operating according to the second RAT may only transmit paging messages to the UE 106 at scheduled wakeup times (paging opportunities) according to the DRX cycle of the second RAT.

Since DRX operation for a given RAT is generally configured such that the "sleeping" portion of the cycle, e.g., in which the radio is not being used, is longer than the "waking" portion of the cycle, it is generally possible for multiple RATs to operate in a DRX mode of operation simultaneously using a shared radio without conflict. However, it is also possible that occasionally, or possibly regularly (e.g., depending on DRX cycle scheduling), conflicts may occur between the RATs such that both RATs are scheduled to wakeup during an overlapping time period. In other words, both RATs may be scheduled to use the radio at the same time, even though the device may not support simultaneous use of the (shared) radio by both RATs.

Accordingly, the UE 106 may be configured to handle such conflicts. FIG. 5 illustrates one such method. The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 502, the UE 106 may operate in a DRX mode according to each of a first RAT and a second RAT using a radio. As described above, the radio may be shared between the RATs, such that only one RAT may have use of the radio at any given time. The RATs may be any of a variety of RATs; as one example, the first RAT might be CDMA2000 1xRTT ("1x"), while the second RAT might be LTE. For example, the UE might utilize 1x for voice calls and SMS service and LTE for data services. Other combinations of RATs (including uses of the above-mentioned RATs for different services) are also possible.

Thus, at certain times the UE 106 may operate according to the first RAT and at other times the UE 106 may operate according to the second RAT. Note that it may be possible for the UE 106 to operate according to both the first RAT and the second RAT simultaneously; for example, a protocol stack according to the first RAT might be active and using the radio, while a protocol stack according to the second RAT might be active but not using the shared radio. For example, the second RAT might perform offline data processing and/or higher (e.g., non-access stratum) layer functionality while active but not use the shared radio. Alternatively, it may be possible that the UE 106 can only operate according to one RAT at a time.

As part of operating in DRX modes according to each of the first RAT and the second RAT, the UE may wakeup and check for paging messages from a first network via a first wireless link (e.g., according to the first RAT) at first paging occasions, and may wakeup and check for paging messages from a second network via a second wireless link (e.g., according to the second RAT) at second paging occasions. Timing of the first paging occasions may be determined in a first manner, while timing of the second paging occasions may be determined in a second (different) manner.

In 504, it may be determined that a conflicting wakeup time is scheduled according to DRX cycles of the first and second RATs; for example, the first and second paging occasions/opportunities for the first and second RAT may conflict (e.g., be scheduled in a temporally overlapping manner). As previously noted, even though it may be possible for the UE 106 to operate in DRX modes of both the first and second RAT simultaneously without conflict, it is also possible that in some cases the times at which the first and second RAT are scheduled to use the radio may conflict.

The conflict may be a one-time conflict, or more commonly, may be a re-occurring conflict. For example, it is common for even different RATs to use integer multiples of 1.28 s as the length of the idle-mode DRX cycle. Thus, if by chance the wakeup times (e.g., paging opportunities) for the first RAT and the second RAT are scheduled to conflict once, it is likely that they will conflict again. For example, if the DRX cycle length according to the first RAT is 5.12 s and the DRX cycle according to the second RAT is 1.28 s, if there is a conflict once, there will be a conflict again every time the first RAT is scheduled to wakeup and every fourth time the second RAT is scheduled to wakeup. The UE 106 may in some cases determine that a conflict will be a repeating conflict, e.g., that multiple future wakeup times/paging occasions will conflict, based on relative DRX cycle lengths of the first and second RAT (e.g., if one of the first or second RAT has a same or integer multiple DRX cycle length of the other RAT).

Note that for idle-mode DRX cycles, it is common for the wakeup time for a UE 106 for a given RAT to be determined based on subscriber identity information (e.g., an international mobile subscriber identity (IMSI), which may be stored in a subscriber identity module (SIM)) for the UE 106. Different RATs (or even different operators of networks using a same RAT) may calculate scheduled wakeup times (e.g., paging opportunities) in different manners (e.g., using different equations/formulas/hash tables/algorithms) and may typically be de-coupled from each other in terms of system time. Thus, there may be a low likelihood for wakeup times for multiple RATs to conflict for any given individual subscriber identities, but given a large enough number of subscriber identities, it is highly possible that at least a few will experience scheduling conflicts at any given time. Since the wakeup times may be scheduled in a predictable manner (e.g., based on IMSI in a manner defined by the network operator and based on the network system time), it may be relatively simple for the UE 106 to determine (e.g., calculate) when such conflicts will occur.

Note that some RATs (such as LTE) may be capable of operating using connected-mode DRX in addition to idle-mode DRX. In this case, it may be more likely that conflicts may be single-occasion occurrences rather than repeating occurrences. This may be because connected-mode DRX cycles may have different lengths and/or length multiples than idle mode DRX cycles, and/or because scheduled wakeup times may be based on different criteria than for idle-mode DRX cycles. On the other hand, connected-mode DRX cycles may typically be much shorter than idle-mode DRX cycles, so the likelihood that wakeup times may randomly conflict if one (or both) of the RATs is operating using connected-mode DRX may be higher.

In 506, a subscriber identity of the UE 106 may be changed in response to determining that a conflicting wakeup time is scheduled. Changing the subscriber identity may be performed in any of a number of ways. The subscriber identity for a UE 106 may commonly reside in a subscriber identity module (SIM). In particular, according to many RATs, an international mobile subscriber identity (IMSI) number is used as a subscriber identity for a UE 106. Thus, the UE 106 may include a SIM which implements at least one IMSI. In addition to an active IMSI, the SIM may also store (e.g., may be pre-loaded with) at least one additional IMSI. In other words, the SIM may be a dual- or multi-IMSI SIM. In this case, changing the subscriber identity might include sending a command or instruction to the SIM to switch IMSIs. The SIM may then deactivate the previously active ("first") IMSI and activate another ("second") IMSI. Note that the second IMSI and the first IMSI may be configured for use in an overlapping geographic area, e.g., an area in which the UE 106 is located at the time the conflict is detected, such that the second IMSI will be recognized by a service provider in which the UE 106 is located when the second IMSI is activated. Also note that it may be possible for the first and second IMSI to provide the UE 106 with service from the same service provider, or from different service providers, as desired.

Note that the SIM may be implemented as a removable SIM card which has been installed in the UE 106 or as an embedded SIM (eSIM) which is integrated with the UE 106. In some cases, particularly if the SIM is an eSIM, it may be possible for the UE 106 to obtain (e.g., purchase and/or provision the SIM with) an additional IMSI over the air, e.g., via one or the other of the first or second RAT. Thus, another possibility for changing the subscriber identity could include obtaining the second IMSI via the first or second RAT and sending a command to the SIM indicating to the SIM to activate the second IMSI. The SIM may then store both the first and second IMSIs (e.g., with the second IMSI activated based on the command from the UE 106), or if desired, may discard the first IMSI after obtaining the second IMSI. For example, a service provider from which a user of the UE 106 receives service might allow the UE 106 to "trade out" IMSIs (e.g., automatically, possibly free-of-charge) as a courtesy in order to avoid conflicts between the first and second RAT in the UE 106 and thereby to provide better user experience.

Since, as noted above, wakeup times may be calculated based on the subscriber identity of the UE 106, changing the subscriber identity may modify the wakeup times according to the DRX cycles of the first and second RAT. Considered another way, changing the subscriber identity may essentially act to change a seed number used to calculate the wakeup times for each of the first and second RAT. Accordingly, changing the subscriber identity may change the designated wakeup times for the UE according to both the first RAT and the second RAT. Furthermore, since the manner in which the wakeup times are calculated from the subscriber identity may differ for each of the first and second RAT, and the system times for the first and second RAT may not be coordinated, there may be a high likelihood that the designated wakeup times for the UE 106 according to the first RAT and second RAT may no longer conflict after changing the subscriber identity of the UE 106. Thus, by changing the seed number (e.g., the subscriber identity) upon which the wakeup times (e.g., paging occasions) are calculated, the UE 106 may effectively avoid conflicts between wakeup times for multiple RATs sharing a radio in the UE 106 in most cases.

Thus, after changing the subscriber identity of the UE 106, the UE 106 may calculate new wakeup/paging occasion times according to DRX operation for each of the first and second RAT. Note also that once the UE 106 has updated its configuration such that the new subscriber identity is activated, the UE 106 may register (e.g., re-register) with network(s) operating the first and second RATs using the new IMSI. In particular, the UE 106 may provide device/subscriber identification information and/or configuration settings and/or receive network configuration settings according to each RAT (e.g., either in a joint registration process or in separate registration processes for each RAT, depending on the system configuration). As part of registering the UE 106, the network(s) operating according to the first RAT and the second RAT may also calculate new wakeup/paging occasion times for the UE 106 based on the new subscriber identity. Thus, the UE 106 and the network(s) operating according to the first and second RAT may remain coordinated with respect to paging occasion timing after the UE 106 has changed subscriber identities.

The UE 106 may then operate in DRX mode according to the first and second RAT simultaneously and without conflict, since the newly calculated wakeup/paging occasion times for the first and second RAT may no longer conflict. In other words, the UE 106 may use the radio according to the first RAT at wakeup times/paging opportunities calculated based on the second subscriber identity in a manner specified according to the first RAT and may use the radio according to the second RAT at wakeup times/paging opportunities calculated based on the second subscriber identity in a manner specified according to the second RAT, in a manner such that the times when the radio is used according to the first RAT and the times when the radio is used according to the second RAT do not conflict.

Thus, according to the present disclosure, conflicts for radio use between RATs in a UE 106 in which multiple RATs share the radio may advantageously be avoided altogether in many situations by switching subscriber identities if such conflicts occur. Accordingly, the UE 106 may avoid the need for complicated conflict handling mechanisms, which may require more power than if no conflict handling is required, in at least some such situations, thereby potentially providing the user with a better experience and possibly simplifying the control algorithms needed to effectively implement a device in which multiple RATs share a radio.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a wireless user equipment (UE) device, the method comprising:
   operating in a discontinuous reception (DRX) mode according to each of a first wireless communication technology and a second wireless communication technology using a single radio, wherein the first wireless communication technology is CDMA2000 1xRTT, wherein the second wireless communication technology is LTE;
   determining that a conflicting wakeup time is scheduled according to DRX cycles of the first and second wireless communication technologies;
   obtaining a new IMSI over the air via one of the first wireless communication technology or the second wireless communication technology in response to determining that a conflicting wakeup time is scheduled according to DRX cycles of the first and second wireless communication technologies;
   activating the new IMSI to change the IMSI of the UE in response to determining that a conflicting wakeup time is scheduled according to DRX cycles of the first and second wireless communication technologies;
   determining new wakeup times according to DRX cycles of each of the first and second wireless communication technologies, wherein the new wakeup times are based on the changed IMSI; and
   operating in the DRX mode according to each of the first wireless communication technology and the second wireless communication technology using the single radio and using the new wakeup times.

2. The method of claim 1,
   wherein the DRX mode is an idle-mode DRX for each of the first and second wireless communication technology, and
   wherein a DRX cycle length of the first wireless communication technology is equal to or an integer multiple of the second wireless communication technology.

3. The method of claim 1,
   wherein activating the new IMSI comprises sending a command to a subscriber identity module indicating (SIM) indicating to the SIM to change the IMSI of the UE to the new IMSI.

4. The method of claim 1,
   wherein obtaining the new IMSI comprises provisioning an embedded subscriber identity module (eSIM) of the UE with the new IMSI.

5. The method of claim 1,
   wherein operating in the DRX mode according to each of the first wireless communication technology and the second wireless communication technology comprises communicating with a first base station using the first wireless communication technology and communicating with a second base station using the second wireless communication technology.

6. The method of claim 1,
wherein DRX cycle wakeup times for the UE according to the first and second wireless communication technologies, respectively, are scheduled to correspond to paging opportunities for the UE according to the first and second wireless communication technologies, respectively.

7. A wireless user equipment (UE) device, the UE comprising:
a radio, comprising one or more antennas configured for wireless communication; and
a processing element configured to:
operate the radio according to either of a first radio access technology (RAT) or a second RAT, wherein a common subscriber identity is used when operating the radio according to both the first RAT and the second RAT;
determine that one or more paging opportunities for the first and second RAT conflict;
obtain a new subscriber identity over the air via one of the first RAT or the second RAT in response to determining that the one or more paging opportunities for the first and second RAT conflict; and
change the common subscriber identity used when operating the radio according to both the first RAT and the second RAT to the new subscriber identity obtained over the air in response to determining that the one or more paging opportunities for the first and second RAT conflict.

8. The UE of claim 7, wherein to change the common subscriber identity, the processing element is configured to:
instruct a subscriber identity module (SIM) to activate the new subscriber identity.

9. The UE of claim 7,
wherein paging opportunity timing for the first RAT is determined in a first manner, wherein paging opportunity timing for the second RAT is determined in a second manner, wherein the first manner is different than the second manner, and wherein the first manner and the second manner are both based at least in part on subscriber identity information for the UE.

10. A method for operating a wireless user equipment (UE) device, the method comprising:
checking for paging messages from a first network via a first wireless link at first paging occasions, wherein timing of the first paging occasions is determined in a first manner based on a first subscriber identity of the UE;
checking for paging messages from a second network via a second wireless link at second paging occasions, wherein timing of the second paging occasions is determined in a second manner based on the first subscriber identity of the UE;
determining that at least one first paging occasion conflicts with at least one second paging occasion;
obtaining a second subscriber identity over the air via one of the first wireless link or the second wireless link in response to determining that at least one first paging occasion conflicts with at least one second paging occasion; and
selecting the second subscriber identity for the UE for use with both the first network and the second network in response to determining that at least one first paging occasion conflicts with at least one second paging occasion, wherein after selecting the second subscriber identity, timing of the first paging occasions is determined in the first manner based on the second subscriber identity and timing of the second paging occasions is determined in the second manner based on the second subscriber identity.

11. The method of claim 10,
wherein the first wireless link comprises a wireless link according to a first radio access technology (RAT), wherein the second wireless link comprises a wireless link according to a second RAT.

12. The method of claim 11,
wherein checking for paging messages from the first network and checking for paging messages from the second network are performed using a shared radio, wherein the shared radio is configured to operate according to either the first RAT or the second RAT.

13. The method of claim 10,
wherein the first paging occasions occur as part of a discontinuous reception (DRX) mode of operation according to a first radio access technology (RAT), and
wherein the second paging occasions occur as part of a DRX mode of operation according to a second RAT.

14. The method of claim 13,
wherein paging occasions occur once per DRX cycle according to the DRX mode of operation according to both the first RAT and the second RAT,
wherein a DRX cycle length according to the first RAT has a same length or an integer multiple length as a DRX cycle length according to the second RAT, and
wherein the method further comprises:
determining that multiple future first and second paging occasions will conflict based on determining that at least one first paging occasion conflicts with at least one second paging occasion and based on the DRX cycle length according to the first RAT having a same length or an integer multiple length as the DRX cycle length according to the second RAT.

15. A wireless user equipment (UE) device, the UE comprising:
a radio, comprising one or more antennas configured for wireless communication, wherein the radio is configured for use according to either of a first radio access technology (RAT) or a second RAT;
a memory medium; and
one or more processing elements configured to execute program instructions comprised on the memory medium;
wherein the UE is configured to:
operate in a discontinuous reception (DRX) mode according to both the first RAT and the second RAT using the radio, wherein DRX according to the first RAT has a first DRX cycle and DRX according to the second RAT has a second DRX cycle;
determine that first wakeup times according to the first DRX cycle conflict with second wakeup times according to the second DRX cycle, wherein the first wakeup times and the second wakeup times are calculated in different manners based on a first international mobile subscriber identity (IMSI) stored in a subscriber identity module (SIM) of the UE, wherein the first IMSI is used both when operating according to the first RAT and when operating according to the second RAT;
provision the SIM with a second IMSI via one of the first RAT or the second RAT in response to determining that first wakeup times according to the first DRX cycle conflict with second wakeup times according to the second DRX cycle; and send a command to the SIM to activate the second IMSI in response to determining that first wakeup times according to the first DRX cycle conflict with second wakeup times according to the second DRX cycle, wherein after the second IMSI is activated the second IMSI is used both when operating according to the first RAT and when operating according to the second RAT.

16. The UE of claim 15, wherein the UE is further configured to, after the second IMSI is activated:
    operate according to the first RAT at third wakeup times according to the first DRX cycle and operate according to the second RAT at fourth wakeup times according to the second DRX cycle, wherein the third wakeup times and the fourth wakeup times are calculated in different manners based on the second IMSI.

17. The UE of claim 16,
    wherein the third wakeup times do not conflict with the fourth wakeup times.

18. The UE of claim 15,
    wherein the first IMSI is configured for use in a first geographic area, wherein the second IMSI is also configured for use in the first geographic area.

19. The UE of claim 15,
    wherein the SIM is an embedded SIM (eSIM) executing on the UE.

* * * * *